(No Model.)

W. PLUMMER.
SEED PLANTER.

No. 303,185. Patented Aug. 5, 1884.

Attest:
Walter Fowler
H. B. Applewhaite

Inventor:
Willard Plummer
per attys.
A. H. Evans & Co.

N. PETERS, Photo-Lithographer, Washington, D. C.

UNITED STATES PATENT OFFICE.

WILLARD PLUMMER, OF MOORESVILLE, INDIANA.

SEED-PLANTER.

SPECIFICATION forming part of Letters Patent No. 303,185, dated August 5, 1884.

Application filed February 12, 1884. (No model.)

*To all whom it may concern:*

Be it known that I, WILLARD PLUMMER, a citizen of the United States, residing at Mooresville, in the county of Morgan and State of Indiana, have invented new and useful Improvements in Seed-Planters, of which the following is a full, clear, and exact description, reference being had to the accompanying drawings, forming part of this specification, in which—

Figure 1:
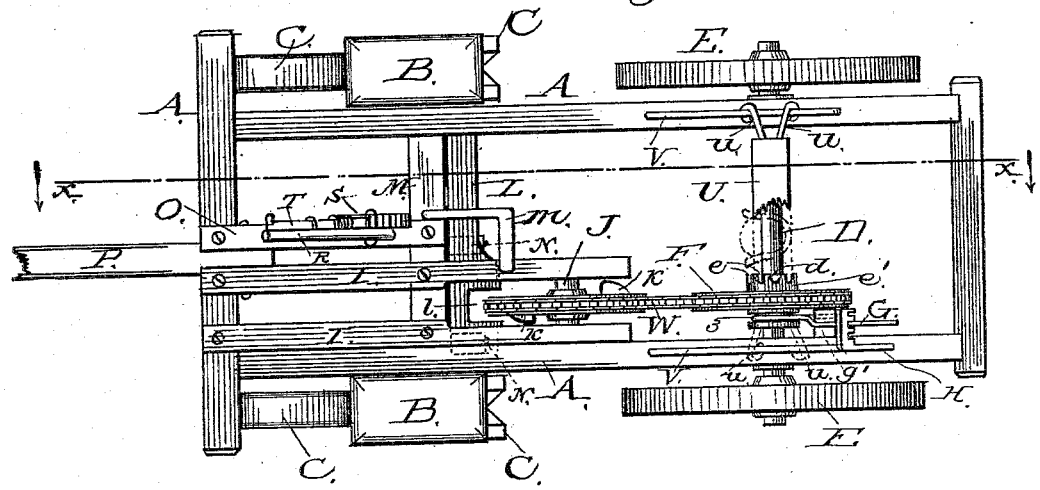
Figure 2:
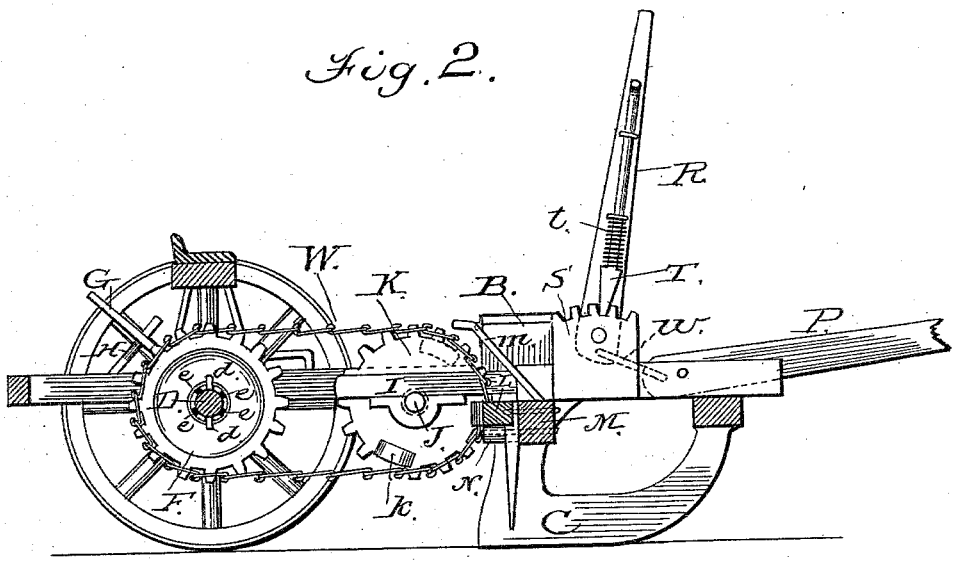

Figure 1 is a top plan view of a seed-planter with my improvements attached. Fig. 2 is a longitudinal sectional view of the same on line *x x* of Fig. 1.

Similar letters of reference indicate corresponding parts.

My invention consists in the novel construction and combination of parts, as will be hereinafter more fully set forth and claimed.

To enable others skilled in the art to make and use my invention, I will proceed to describe the exact manner in which I have carried it out.

In the said drawings, A represents the frame of a planter, having the ordinary seed-boxes, B, and shoes C secured thereto in the usual manner. D is the axle, suitably journaled in the frame A, and on which are mounted the wheels E E. The axle D has two projecting lugs, *d d*, formed thereon, and adapted to engage the notches *e*, formed on the hollow hub or sleeve *e'* of a toothed wheel, F, the hub on the side opposite to the notches being extended, and having an annular groove formed thereon adapted to receive the bifurcated ends 3 of a lever, G, which has its fulcrum in a stud, *g'*, projecting from the frame of the machine.

Secured to the frame A immediately in the rear of the stud is a bar, H, which, after passing upward a sufficient distance, is bent inward and parallel to the stud *g'*, and this bar H has formed on its under surface a series of teeth or notches adapted to engage and hold the lever G when the wheel is in gear or out of gear with the axle D.

I I represent longitudinal beams secured to the frame in any well-known manner, and provided with bearings for the reception of the short axle J of a toothed wheel, K, connected to the wheel F by a link-chain, W. This wheel K, I construct with two beveled-faced cams or lugs, *k*, arranged equidistant from each other, and adapted to alternately open and close the openings in the seed-boxes by means of a sliding bar, L, having an opening, *l*, formed thereon, through which work the cams or lugs attached to the toothed wheel K. The sides of said opening may have rounded or beveled edges, so as to more effectually accomplish the purpose intended.

From a cross-beam, M, on which the seed-boxes are supported, rises the ordinary foot-rest, *m*, and pivoted between the cross-beam and the sliding bar is a marker. Beneath this cross-beam M, and secured thereto by a suitable shaft or axle, are anti-friction rollers N N, which permit of a free and easy sliding movement to the slide-bar.

Between the longitudinal beams I and O is pivotally secured the tongue or shaft P, connected at its rear end by a link, *w*, the short arm of a pivoted lever, R, having its fulcrum in a stud, S, rising from the beam O. The stud S has teeth formed thereon, in which the end of a sliding bar, T, is placed. The bar T slides in staples secured to the lever R, and a coil-spring, *t*, is adapted to hold the end of lever R in the teeth until released therefrom by the operator. From this construction it is evident that by drawing the lever R in the direction of the arrow the front portion of the tongue is lowered, and the tendency of the "pull" will be to raise the forward part of the machine, thereby causing the shoes to run shallower. The reverse is the case if the lever is pushed forward by the operator. That would cause the pole to be raised and the shoes of the planter to run deeper in the earth.

U represents the adjustable seat extending across the machine, and having downwardly-projecting legs *u u*, formed with holes or loops which encircle the guides V, secured to the frame A. From this construction it is evident that this seat can be moved backward or forward, thereby increasing or diminishing the weight upon the shoes on the front part of the machine and causing them to run deep or shallow, as desired.

Having thus fully described my invention, what I claim as new, and desire to secure by Letters Patent, is—

1. In a seed-planter, the toothed wheel K, having lugs *k*, the frames I I, and anti-friction roller N, in combination with the link-chain W, the toothed wheel F, with its hub *e*, having notches and an annular groove formed thereon, the axle D, with its lugs $d\ d$, the lever G, and bar H, substantially as and for the purpose set forth.

2. In a seed-planter, the toothed wheel F, having a hub with notches formed on one side and an annular groove formed on the opposite side, adapted to engage the bifurcated end of a lever, G, in combination with the bar H, axle D, having lugs $d\ d$ secured thereto, the chain W, and toothed wheel K, all arranged to operate substantially as and for the purpose set forth.

WILLARD PLUMMER.

Witnesses:
 HENRY C. CARTER,
 WILLIAM A. KINNEY.